(12) United States Patent
Deflandre

(10) Patent No.: US 8,931,623 B2
(45) Date of Patent: Jan. 13, 2015

(54) DEVICE FOR THE ACCUMULATION OF PRODUCTS

(76) Inventor: Hervé Deflandre, La Chappele d'Armentieres (FR)

(*) Notice: Subject to any disclaimer, the term of this patent is extended or adjusted under 35 U.S.C. 154(b) by 0 days.

(21) Appl. No.: 14/118,894

(22) PCT Filed: May 22, 2012

(86) PCT No.: PCT/FR2012/051131
§ 371 (c)(1),
(2), (4) Date: Dec. 18, 2013

(87) PCT Pub. No.: WO2012/160304
PCT Pub. Date: Nov. 29, 2012

(65) Prior Publication Data
US 2014/0110221 A1    Apr. 24, 2014

(30) Foreign Application Priority Data
May 24, 2011 (FR) ..................................... 11 54500

(51) Int. Cl.
*B65G 21/14*  (2006.01)
*B65G 47/26*  (2006.01)
*B65G 47/51*  (2006.01)

(52) U.S. Cl.
CPC .............. *B65G 47/268* (2013.01); *B65G 21/14* (2013.01); *B65G 47/5131* (2013.01); *B65G 2201/0244* (2013.01)
USPC ......... 198/594; 198/347.1; 198/831; 198/812

(58) Field of Classification Search
CPC ............. B65G 47/5131; B65G 47/268; B65G 2201/0244; B65G 21/14
USPC .............. 198/594, 347.1, 831, 812, 606, 607, 198/456, 457.03
See application file for complete search history.

(56) References Cited

U.S. PATENT DOCUMENTS

| | | | | | |
|---|---|---|---|---|---|
| 4,413,724 | A | * | 11/1983 | Fellner | 198/594 |
| 4,549,647 | A | | 10/1985 | Cossé | |
| 6,698,581 | B2 | * | 3/2004 | Steeber et al. | 198/602 |
| 7,191,896 | B2 | * | 3/2007 | Hartness et al. | 198/594 |
| 7,222,723 | B2 | * | 5/2007 | Horton et al. | 198/594 |
| 2003/0155212 | A1 | * | 8/2003 | Abert et al. | 198/594 |

FOREIGN PATENT DOCUMENTS

JP        59053315 A    3/1984

* cited by examiner

*Primary Examiner* — Mark A Deuble
(74) *Attorney, Agent, or Firm* — MH2 Technology Law Group

(57) ABSTRACT

The invention relates to an accumulation device (4) comprising a first linear conveyor belt (5) and a second linear conveyor belt (6), a third conveyor belt (7) forming a semi-circle and configured for transferring items from the first to the second conveyor belt and translation means (10, 11) of the third belt relative to the first and second belt. The accumulation device comprises two ramp systems (23, 24) attached respectively to the two ends (7a, 7b) of the third belt. The first ramp system (23) deforms the first belt to constitute a first slope ensuring that items rise from the first belt to the third belt. The second ramp system (24) deforms the second belt to constitute a second slope ensuring that items descend from the third belt to the second belt. Displacement of the third conveyor belt at the same time enables displacement of the first and second slopes formed on the first and second belt. The invention also relates to an installation equipped with such an accumulation device.

14 Claims, 3 Drawing Sheets

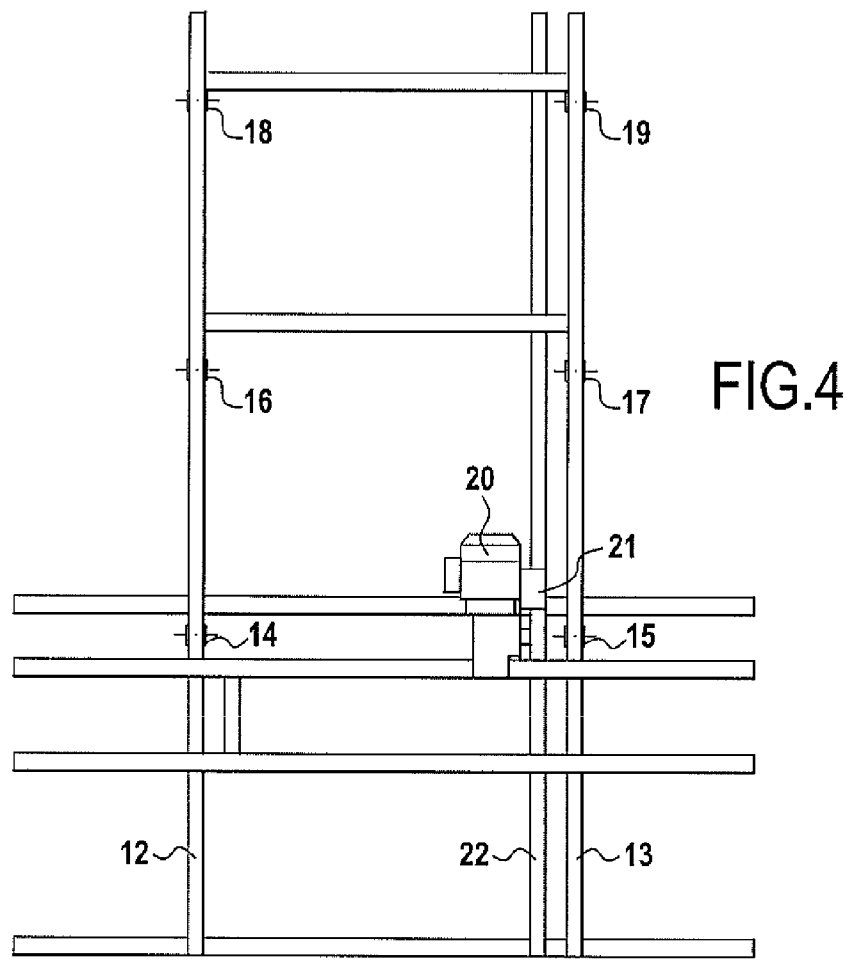
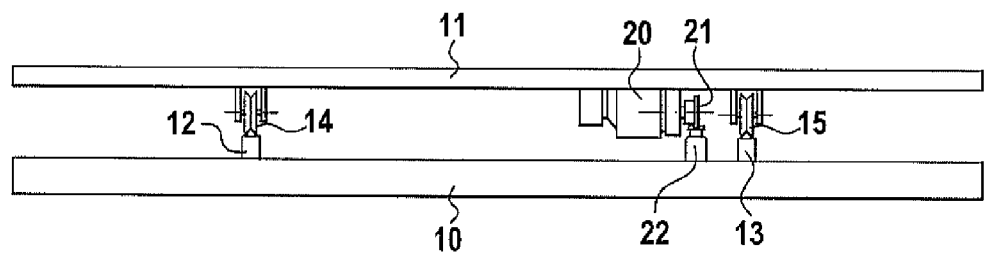

DEVICE FOR THE ACCUMULATION OF PRODUCTS

TECHNICAL FIELD

The present invention relates to an accumulation device for products for conveying said products from a first workstation to a second workstation by constituting a buffer zone especially for compensating the differences in work rates between the first workstation and the second workstation and regulating the production line. The invention also relates to an installation which comprises at least a first workstation and a second workstation as well as an accumulation device, the subject matter of the invention, arranged between said workstations.

BACKGROUND OF THE DISCLOSURE

Such an accumulation device is already known to the expert. One such is described for example in document FR 2 524 436 and comprises a first linear conveyor belt configured to transfer items in a first direction, a second linear conveyor belt parallel to the first conveyor belt configured to transfer the items in a second reverse direction relative to the first and a third conveyor belt forming a semi-circle configured to transfer the items from the first conveyor belt to the second conveyor belt. The accumulation device also comprises translation means configured to translate the third conveyor belt relative to the first and second conveyor belt in the first direction or inversely in the second direction. This third conveyor belt is offset upwards relative to the first and second conveyor belts. Also, two ramps are arranged at the level of the two ends of the third conveyor belt and attached to the latter such that the translation of the third conveyor belt at the same time enables displacement of the ramps which slide vis-à-vis the first and the second conveyor belts to modulate the length of the accumulation device. These ramps enable products to rise from the first conveyor belt to the third conveyor belt and inversely enable products to descend from the third conveyor belt to the second conveyor belt. These ramps are constituted by a tab on which the products slide as they rise or descend under the effect of the thrust exerted by the products placed upstream and moving in the conveying direction on the conveyor belts. It is understood that the ramps slide on the first and the second conveyor belts at the same time as they move to the third conveyor belt, which can cause premature degradation of said first and second conveyor belts. Also, the design of the accumulation device according to this document FR 2 524 436 is particularly adapted for products having a low mass, such as biscuits. It is understood that if the mass of the products is much greater for example for bottles, such a ramp design can cause difficulties for transferring products from the first conveyor belt to the third conveyor belt and inversely from the third conveyor belt to the second conveyor belt, since said transfer is made by sliding on the tabs and therefore requires greater thrust of those products placed upstream, which can optionally slide on the first conveyor belt, or even tip over. Similarly, as products move from the first conveyor belt on the tab of the ramp, it is understandable that it can be difficult for products to surmount the edge of said tab, and this may cause the products to tip over.

Document JP 59 053315 also describes an accumulation device which comprises a ramp system associated with a semi-circular conveyor with rollers of gravity type having a descending slope whereof the input is elevated relative to the output. In this device, the conveyed items are pulled up by the ramp system from a first belt then descend under gravity to the second belt by travelling on the semi-circular conveyor with rollers from its input to its output located under the first end. Such a device does not convey series of products which have to stay in line relative to each other.

SUMMARY OF THE DISCLOSURE

The aim of the invention is to provide an accumulation device to eliminate the above disadvantages. For this, the accumulation device forming the subject matter of the present invention comprises a first linear conveyor belt configured to transfer items or products in a first direction, a second linear conveyor belt parallel to the first conveyor belt and configured to transfer the items in a second direction inverse to the first direction, and a third conveyor belt forming a semi-circle and configured to transfer the items from the first conveyor belt to the second conveyor belt. Also, the accumulation device according to the invention comprises translation means configured to translate the third conveyor belt relative to the first and second conveyor belts, in the first direction or in the second direction, said third conveyor belt being offset upwards relative to the first and second conveyor belts. According to the invention, the accumulation device comprises two ramp systems attached respectively at the two ends of the third conveyor belt, the first ramp system being configured to deform the first conveyor belt and constitute a first slope ensuring that items rise from the first conveyor belt to the third conveyor belt, and the second ramp system being configured to deform the second conveyor belt and constitute a second slope ensuring that items descend from the third conveyor belt to the second conveyor belt, with displacement of the third conveyor belt at the same time enabling displacement of the first and second slopes formed on the first and second conveyor belts.

It is understood that according to this design of the accumulation device forming the subject matter of the invention the slopes are made directly on the first conveyor belt and the second conveyor belt, which makes conveying items easier since transfer is effected directly between the belts now in motion and cancels out passing through an intermediate step on a ramp according to which said products are transferred by sliding under the effect of the thrust of items positioned upstream. This design according to the invention is therefore also well adapted both for small-sized and large-sized products. Also, since transfer is done directly between the conveyor belts, this limits the risks of products tilting.

It is also understood that both the input and the output of the third conveyor belt are elevated relative to the first and second conveyor belts.

According to the invention, the third conveyor belt extends in a plane. In other terms, according to the invention the input and the output of the third conveyor belt are located at the same level, in the same plane. This plane is advantageously horizontal.

According to the accumulation device forming the subject matter of the invention the first conveyor belt comprises a first conveyor belt which is fitted with a first internal face, the second conveyor belt comprises a second conveyor belt which is fitted with a second internal face. Also, the first and second ramp systems comprise respectively a first and second roller which are mounted pivotingly along axes transversal to the first and second conveyor belts and adjacently to the first and second ends of the third conveyor belt, these first and second rollers supported respectively on the first and second internal faces to constitute said first and second slopes. Use of such rollers cancels out friction on the internal face of the conveyor belts during displacement of the first and second ramp systems at the same time to the third conveyor belt.

It is therefore understood that the first and second ends of the third conveyor belt are elevated relative to the first and second conveyor belts by means of the two ramps.

The third conveyor belt preferably comprises a third conveyor belt which is motorised. For this purpose, the accumulation device comprises a motor, preferably fixed to a housing of the third conveyor belt, which sets the third conveyor belt in motion. The third conveyor belt is preferably configured so that the advance speed of the third conveyor belt is synchronised with the advance speed of the first and second conveyor belts. An aim here is to be able to precisely regulate the advance speed of the products on the production line.

Also, the conveyor belt extends in a plane, preferably substantially horizontal.

According to the accumulation device forming the subject matter of the invention, the first conveyor belt is fitted with a first external face and the second conveyor belt is fitted with a second external face. Also, the third conveyor belt comprises a third external face advantageously extending in a plane which is advantageously horizontal.

Also, the first and second ramp systems comprise first and second counter-rollers which are mounted pivotingly along axes transversal to the first and second conveyor belts and configured to be supported respectively against the first and second external faces so as to restore the normal position of the first and second conveyor belts. Similarly, the use of counter-rollers reduces friction of the latter on the external faces of the conveyor belts.

According to the accumulation device forming the subject matter of the invention, the first ramp system comprises two first flanges positioned in the extension of the first end of the third conveyor belt to which they are attached. These two first flanges are positioned with a distance between them, each on one of the lateral sides of the first conveyor belt. Also, the first roller and the first counter-roller are mounted in a pivot link along the transversal axes, relative to the two first flanges.

Similarly, according to the accumulation device forming the subject matter of the invention the second ramp system comprises two second flanges positioned in the extension of the second end of the third conveyor belt to which they are attached. The two second flanges are positioned with a distance between them, each on one of the lateral sides of the second conveyor belt. Also, the second roller and the second counter-roller are mounted in a pivot link along the transversal axes, relative to the two second flanges.

According to the accumulation device forming the subject matter of the invention, the latter comprises a fixed support structure on which the first and second conveyor belts are mounted, and a mobile support structure on which the third conveyor belt and the first and second ramp systems are mounted. Also, a slide link is arranged between the fixed support structure and the mobile support structure to move the third conveyor belt and the two ramp systems in the first or the second direction relative to the first and second conveyor belts.

According to the accumulation device forming the subject matter of the invention, the latter comprises a transmission system arranged between the fixed support structure and the mobile support structure and a motor configured to actuate the transmission system. This transmission system is preferably of the rack-and-pinion type. Other embodiments such as an endless belt or screw are also feasible.

The invention also relates to an installation comprising a first workstation, a second workstation and an accumulation device forming the subject matter of the invention, said accumulation device being arranged between the first workstation and the second workstation to convey products from the first workstation to the second workstation.

According to the installation forming the subject matter of the invention, the latter is configured for packaging products, the first workstation comprising a shrinkwrapper configured for bundling together several products and the second workstation comprising a palletiser configured for stacking the packets of products onto pallets.

Preferably, the installation according to the invention is configured for packaging products of bottle type. Its use for any other type of product such as for example biscuits or pharmaceutical products is also feasible.

BRIEF DESCRIPTION OF THE DRAWINGS

The characteristics of the present invention will emerge from the following description of a preferred design embodiment in reference to the figures, in which:

FIGS. 4 and 5 illustrate a plan view and a frontal elevation of the structure of the support of the conveyor belts;

MORE DETAILED DESCRIPTION

Figure 1:
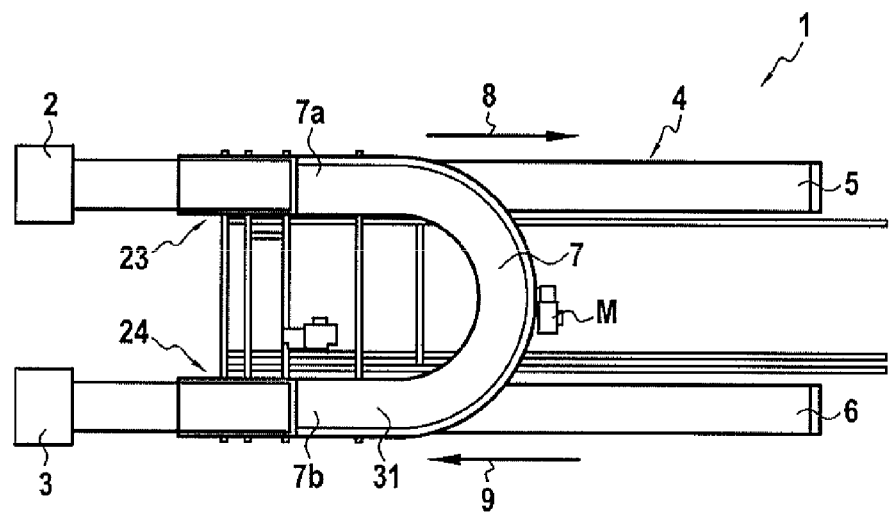
FIGS. 1 and 2 illustrate a plan view of an installation comprising an accumulation device arranged between a first workstation and a second workstation, in a first position of minimum accumulation and in a second position where the accumulation is maximum.
Figure 2:
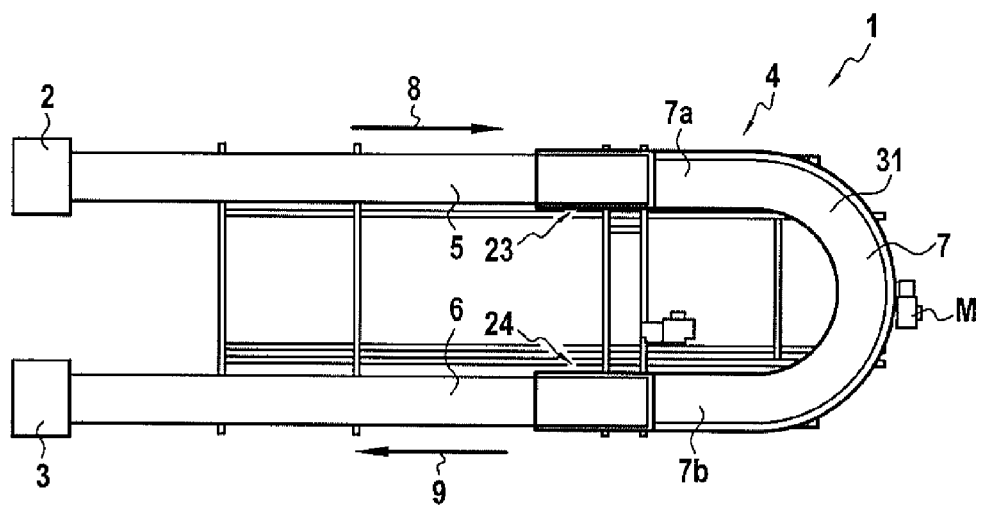

According to a preferred embodiment, the installation 1 illustrated in FIGS. 1 and 2 is configured for packaging bottles, boxes or any other product, the latter constituting a first workstation 2 comprising a shrinkwrapper configured for bundling together the bottles by way of a film, for example to make up packets of four, six or even eight bottles, the accumulation device according to the invention then forwarding the packets of bottles to a second workstation 3 which in this case comprises a palletiser for stacking packets of bottles on pallets. It is feasible to utilise other installations equipped with such an accumulation device forming the subject matter of the invention for other applications and other products or items when it is necessary to be able to modulate the quantity of products accumulated between the first workstation 2 and the second workstation 3, as a function of the work rate of said stations.

With respect to FIGS. 1 and 2 it is evident that the accumulation device 4 comprises a first conveyor belt 5, a second conveyor belt 6 and a third conveyor belt 7. The first conveyor belt 5 and the second conveyor belt 6 are linear. These conveyor belts 5 and 6 preferably comprise a conveyor belt mounted in a loop and turning on itself by means of a drive system of motor type known to the expert. In this non-limiting example the conveyor belts comprise a hinged modular chain, preferably made of plastic.

The first conveyor belt 5 conveys products to the output of the first workstation 2, in a first direction defined by arrow 8 illustrated in FIGS. 1 and 2. Inversely, the second conveyor belt 6 conveys products in a second direction defined by arrow 9 illustrated in FIGS. 1 and 2 so as to forward the items to the second workstation 3. Also, the third conveyor belt comprises a semi-circular form such as illustrated in FIGS. 1 and 2, which transfers the products from the first conveyor belt 5 to the second conveyor belt 6. It is also evident that these first and second conveyor belts 5 and 6 are arranged linearly and are parallel to each other.

The accumulation device according to the invention also comprises a motor M connected to the conveyor belt 31 of the third conveyor belt 7 for advancing said conveyor belt according to a semi-circular trajectory. To do this, the conveyor belt 31 is mounted in a loop by means of rollers arranged in the housing of the third conveyor belt.

Also, as is evident from FIGS. 1, 2, 3 and 6, the conveyor belt 31 of the third conveyor belt 7 extends in a horizontal plane. More precisely, it is clear that it is the external face of said conveyor belt 31 of the third conveyor belt which extends in a horizontal plane.

Advancement of the conveyor belt of the third conveyor belt guides the products to be conveyed from the input to the output of the third conveyor belt, the products moving in a horizontal plane.

Figure 3:
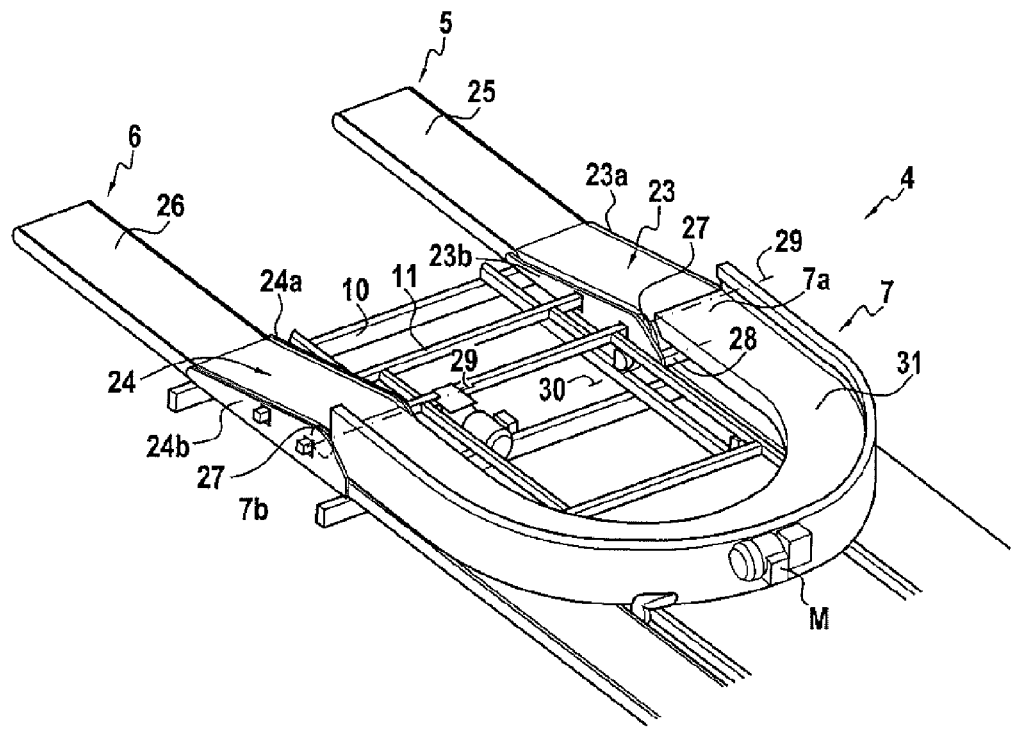
FIG. 3 illustrates a perspective view of the accumulation device forming the subject matter of the invention.

As understood from FIG. 3, the accumulation device 4 comprises a first fixed support structure 10 and a second mobile support structure 11 relative to the fixed support structure 10. For this, as understood from FIGS. 4 and 5, the mobile support structure 11 is mounted in a slide link relative to the fixed support structure 10. The fixed support structure 10 comprises guide rails 12, 13, whereas the mobile support structure 11 comprises track rollers 14, 15, 16, 17, 18, 19 distributed uniformly over said mobile support structure 11. This slide link translates the mobile support structure 11 relative to the fixed support structure 10 either in the direction of arrow 8 or inversely of arrow 9 so as to reduce to a maximum the product accumulation zone or else to increase said accumulation zone to a maximum, as can be seen respectively in FIGS. 1 and 2.

It is also noted the presence of a motor 20 which drives in rotation a pinion 21 meshing with a rack 22, arranged in the longitudinal direction parallel to the rails 12, 13, such as illustrated in FIGS. 4 and 5. The motor 20 is a two-way rotation motor for driving rotation of the pinion 21 in a first direction of rotation or in a second direction of rotation and for moving the mobile support structure 11 in the direction of arrow 8 or inversely in the direction of arrow 9. Other transmission systems actuated by means of a motor such as for example an endless screw or a transmission belt are also feasible.

In reference to FIG. 3, this shows the presence of two ramp systems 23, 24. The first ramp system 23 is arranged between the first conveyor belt 5 and the third conveyor belt 7 and elevates products from the first conveyor belt 5 to the third conveyor belt 7 on which products collect. Inversely, the second ramp system 24 is arranged between the third conveyor belt 7 and the second conveyor belt 6 and allows products to descend from the third conveyor belt 7 to the second conveyor belt 6.

It is therefore clear that the horizontal plane in which the conveyor belt of the third conveyor belt 31 extends is located above the first and second conveyor belts. It is therefore the first and second ramp systems which elevate and lower the products.

Figure 6:
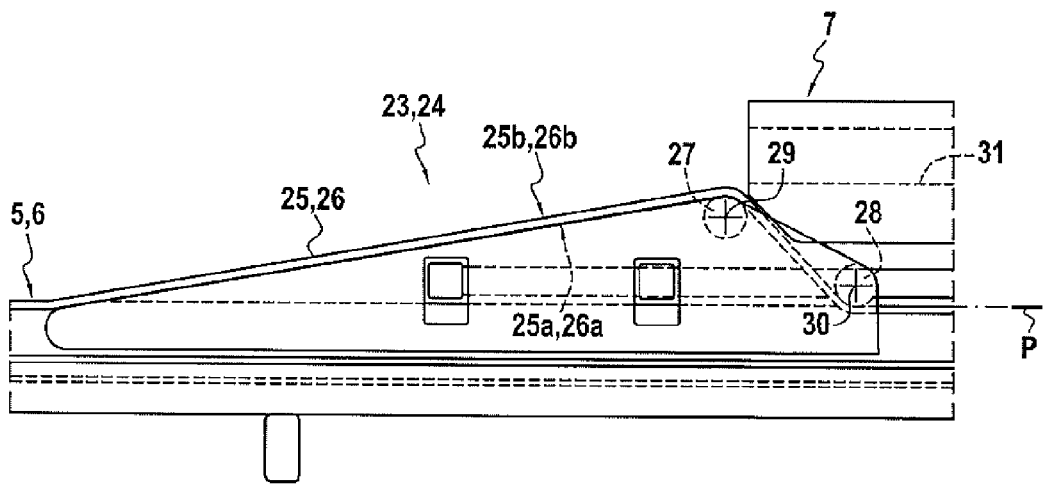
FIG. 6 illustrates a side elevation showing the design of the ramp system.

In reference to FIGS. 3 and 6, it is clear that the ramp systems 23, 24 are used by realising deformation of the conveyor belt 25 of the first conveyor belt 5 and of the conveyor belt 26 of the second conveyor belt 6. It is clear that the first and the second conveyor belts 25, 26 each comprise an internal face 25a, 26a and an external face 25b, 26b. The ramp systems 23, 24 each comprise a first flange 23a, 24a and a second flange 23b, 24b such as illustrated in FIG. 3. The internal flange 23b of the first ramp system is fixed to the internal flange 24a of the second ramp system to solidify the assembly.

In reference to FIG. 6 it is clear that these ramp systems 23, 24, each comprise a first roller 27 which is supported against the internal face 25a, 26a of the conveyor belt 25, 26 of the first and second conveyor belts 5, 6 so as to constitute a slope such as illustrated in FIGS. 3 and 6 for compensating the difference in height between the first conveyor belt 5 and the third conveyor belt 7 and similarly between the second conveyor belt 6 and the third conveyor belt 7.

Also, these ramp systems 23, 24 each comprise a counter-roller 28, illustrated in FIG. 6, which is supported on the external face 25b, 26b of the conveyor belt 25, 26 of the first and second conveyor belts 5, 6. This counter-roller 28, which is preferably arranged under the third conveyor belt, restores the normal position of the conveyor belt 25, 26 in the plane P of said first and second conveyor belts 5, 6. In reference to FIGS. 3 and 6 it is evident that the roller 27 and the counter-roller 28 are mounted pivotingly along the transversal axes 29, 30 relative to the conveyor belts 25, 26 of the first and of the second conveyor belts 5, 6.

Furthermore, the roller 27 is arranged between the low end of the ramp system and the counter-roller 28, the roller 27 being positioned higher than the counter-roller 28. This configuration minimises torsional forces applied to the conveyor belts when rollers and counter-rollers are moving.

The flanges 23a, 23b are fixed on the mobile support structure 11, at the level of the first end 7a of the third conveyor belt 7, and positioned on each lateral side of the conveyor belt 25 of the first conveyor belt 5, as illustrated in FIG. 3. Similarly, the flanges 24a, 24b of the second ramp system 24 are fixed on said support structure 11, at the level of the second end 7b of the third conveyor belt 7, and positioned on each lateral side of the conveyor belt 26 of the second conveyor belt 6. It is therefore clear that these ramp systems 23, 24 are attached to the two ends 7a, 7b of the third conveyor belt 7. Therefore, translation of the third conveyor belt 7 in the direction of arrow 8 or inversely of arrow 9 at the same time enables displacement of the rollers 27 and counter-rollers 28, ensuring displacement of the slopes on the conveyor belts 25, 26 of the first and second conveyor belts 5, 6.

With reference to FIGS. 3 and 4 it is clear that the rollers 27 are positioned adjoining the conveyor belt 31 of the third conveyor belt 7 to suitably ensure transfer in an ascending movement of products from the conveyor belt 25 of the first conveyor belt 5 onto the conveyor belt 31 of the third conveyor belt 7, and inversely transfer in a descending movement of products from the conveyor belt 31 of the third conveyor belt 7 onto the conveyor belt 26 of the second conveyor belt 6.

The counter-roller 28 restores the position of the conveyor belt 5, 6 of the first and second rollers 5, 6 by avoiding contact from said belt with the conveyor belt 31 of the third conveyor belt 7, as is evident from FIG. 6.

Other features are feasible without departing from the scope of the present invention, especially as to the design of the conveyor belts 5 and 6, the workstations 2 and 3, transmission between the mobile structure 11 and the fixed structure 10.

The invention claimed is:

1. An accumulation device comprising a first linear conveyor belt configured to transfer items in a first direction, a second linear conveyor belt parallel to the first conveyor belt and configured to transfer the items in a second direction inverse to the first direction, a third conveyor belt forming a semi-circle and configured to transfer the items of the first conveyor belt to the second conveyor belt and translation means configured to translate the third conveyor belt relative to the first and second conveyor belts, in the first direction or in the second direction, said third conveyor belt being offset upwards relative to the first and second conveyor belt, wherein the accumulation device comprises two ramp systems attached respectively at the two ends of the third conveyor belt, the first ramp system being configured to deform the first conveyor belt and constitute a first slope ensuring that items rise from the first conveyor belt on the third conveyor belt and, the second ramp system being configured to deform the second conveyor belt and constitute a second slope ensuring that items descend from the third conveyor belt on the second conveyor belt, the displacement of the third conveyor belt at the same time enabling displacement of the first and second slopes formed on the first and second conveyor belts.

2. The accumulation device according to claim 1, wherein the first conveyor belt comprises a first conveyor belt which is fitted with a first internal face, the second conveyor belt comprises a second conveyor belt which is fitted with a second internal face, the first and second ramp systems comprising respectively a first and second roller which are mounted pivotingly along axes transversal to the first and second conveyor belts and adjoining the first and second ends of the third conveyor belt, said first and second rollers supported respectively on the first and second internal faces to constitute said first and second slopes.

3. The accumulation device according to claim 2, wherein the first conveyor belt is fitted with a first external face and the second conveyor belt is fitted with a second external face, the first and second ramp systems comprising respectively a first and second counter-rollers which are mounted pivotingly along the axes transversal to the first and second conveyor belts and configured to be supported respectively against the first and second external faces and restore the normal position of the first and second conveyor belts.

4. The device according to claim 3, wherein the first and second rollers are located higher than the first and second counter-rollers, and in that the first and second counter-rollers are located below the third conveyor belt.

5. The accumulation device according to claim 3, wherein the first ramp system comprises two first flanges positioned in the extension of the first end of the third conveyor belt to which they are attached, the two first flanges being positioned with a distance between them, each on one of the lateral sides of the first conveyor belt, the first roller and the first counter-roller being mounted in a pivot link along the transversal axes relative to the two first flanges.

6. The accumulation device according to claim 5, wherein the second ramp system comprises two second flanges positioned in the extension of the second end of the third conveyor belt to which they are attached, the two second flanges being positioned with a distance between them, each on one of the lateral sides of the second conveyor belt, the second roller and the second counter-roller being mounted in a pivot link along the transversal axes relative to the two second flanges.

7. The accumulation device according to claim 1, wherein the third conveyor belt comprises a third conveyor belt which extends in a plane.

8. The accumulation device according to claim 7, wherein that said plane is horizontal.

9. The accumulation device according to claim 1, wherein the third conveyor belt comprises a third conveyor belt and a motor for advancing said third conveyor belt according to a semi-circular trajectory.

10. The accumulation device according to claim 1, which comprises a fixed support structure on which the first and second conveyor belts are mounted and a mobile support structure on which are mounted the third conveyor belt and the first and second ramp systems, a slide link being arranged between the fixed support structure and the mobile support structure for moving the third conveyor belt in the first or second direction relative to the first and second conveyor belt.

11. The accumulation device according claim 10, wherein a transmission system is arranged between the fixed support structure and the mobile support structure and a motor is configured to actuate the transmission system.

12. An installation comprising a first workstation, a second workstation and an accumulation device according to claim, said accumulation device being arranged between the first workstation and the second workstation to convey products from said first workstation to said second workstation.

13. The installation according to claim 12, which is configured for packaging products, the first workstation comprising a shrinkwrapper configured for bundling together several products, and the second workstation comprising a palletiser configured for stacking the packets of products onto pallets.

14. The installation according to claim 13, wherein the products are bottles.

* * * * *